April 28, 1925.

T. B. DUPREE ET AL

PACKING

Filed Dec. 5, 1922

1,535,456

Inventors
Thomas Blake Dupree
Hampton P. Rhodes

By Hardwig Cathey
Attorneys

Patented Apr. 28, 1925.

1,535,456

UNITED STATES PATENT OFFICE.

THOMAS BLAKE DUPREE AND HAMPTON P. RHODES, OF HOUSTON, TEXAS; SAID RHODES ASSIGNOR TO SAID DUPREE.

PACKING.

Application filed December 5, 1922. Serial No. 604,994.

*To all whom it may concern:*

Be it known that we, THOMAS BLAKE DUPREE and HAMPTON P. RHODES, citizens of the United States, residing at Houston, in the county of Harris and State of Texas, have invented certain new and useful Improvements in Packings, of which the following is a specification.

This invention relates to new and useful improvements in a packing.

One object of the invention is to provide a packing for piston rods and for other uses to which packing may be applied.

Another object of the invention is to provide a packing consisting of a core formed of asbestos or other similar material which is enveloped by a soft metal covering, preferably formed of lead or babbitt or a combination of both, said metal covering being formed of thin ribbon like strips packed closely together, all arranged within a covering or backing of rubber or other similar resilient material.

Another object of the invention is to provide a packing of the character described which is capable of being thoroughly saturated with graphite or other heavy lubricant which will thus render the packing more effective in making the stuffing box or other bearing water tight.

A further feature of the invention resides in the provision of a packing of convenient form which may be readily applied and which is efficient and durable in structure and on account of its elasticity will fit closely against the piston rod or other movable part to prevent leakage.

With the above and other objects in view the invention has particular relation to certain novel features of construction, arrangement of parts, and use, an example of which is given in this specification and illustrated in the accompanying drawings, wherein:—

Figure 2:
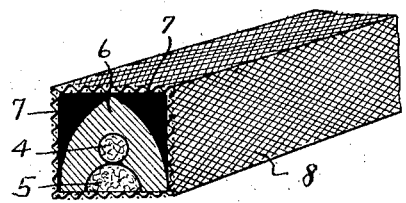
Figure 1:
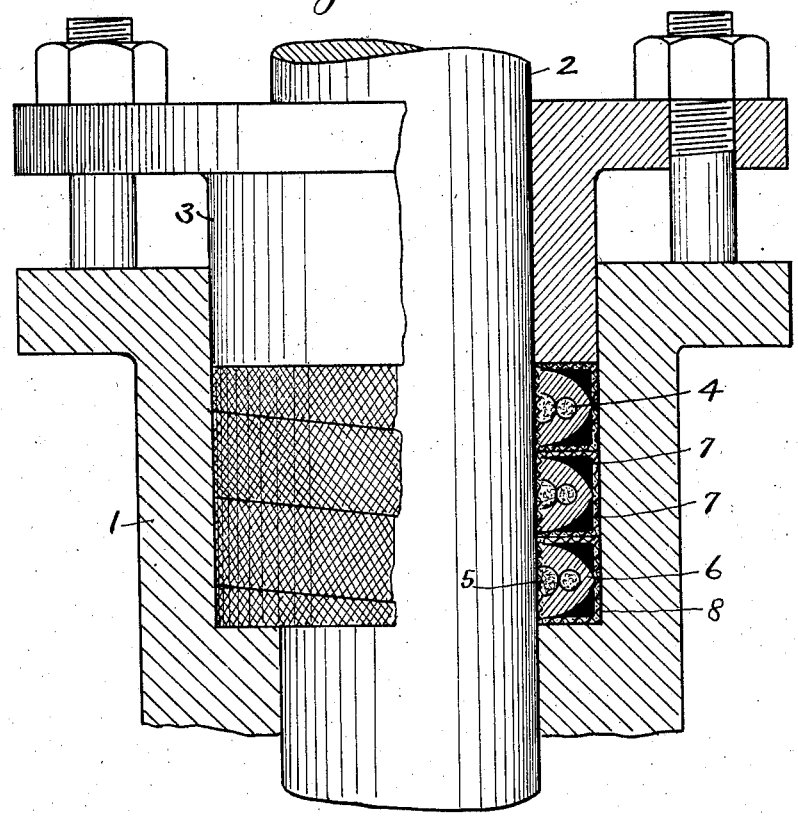

Figure 1 is a sectional view of a stuffing box showing the application of the packing to the piston rod and, Figure 2 is a section of the packing.

In the drawings the numeral 1 designates the stuffing box through which the piston rod 2 reciprocates. The packing is clamped in the stuffing box around the piston rod by the gland 3 which is bolted therein in any conventional manner. The numeral 4 designates a central core of the packing which is preferably formed of asbestos, and adjacent it on the piston rod side of the packing there is a half round core 5 also formed of asbestos. This last mentioned core presents a comparatively wide bearing surface to the piston rod 3 and is not only durable but is lubricant retaining. Surrounding these cores there is the metallic covering 6, preferably formed of lead or babbitt or a mixture of these metals. This covering is not of solid metal but is formed of thin metallic strips, ribbon like in form packed closely together and the metallic covering, as well as the cores 4 and 5, are thoroughly saturated with graphite or other lubricant in the process of manufacture.

A covering or backing is provided, consisting of the strips 7, 7, preferably of rubber or other resilient material. These strips are preferably triangular in cross section and are fitted together so that their outer sides will be flush with each other, thus forming a groove between them, triangular in cross section, to receive the core formed of said asbestos with its metal covering. These parts are bound together by a fabric covering 8 so as to hold them in proper relation until they are clamped in the stuffing box around the piston rod. The fabric adjacent the piston rod will soon wear away allowing the inner face of the packing to fit against said rod.

In application a length of the packing is wound around the piston rod and confined in the stuffing box 1, and the gland 3 is then inserted and clamped against the packing. In winding the packing the rubber covering 7 is wound on the outside so that the core 5 will rest against the piston rod 2 and when the packing is placed under compression the core will be held tightly against the piston rod and will prevent leakage past it. As the core is worn away by the reciprocation of the piston rod the resilient strips 7 will expand and continue to force the core in against the piston rod until said strips have expanded to their full extent. The gland may then be further tightened up and the packing will again closely fit around the piston rod as before. The compression of the resilient ring 7 against the metal covering 6 will constantly force the lubricant contained therein outwardly into the asbestos cores, 4 and 5, thus keeping them thoroughly saturated and rendering the packing more efficient and lasting.

What we claim is:—

1. A packing constructed with a core formed of asbestos surrounded by soft metal, an outside cover for said core formed of resilient material arranged in two lengthwise sections, said core and metal being saturated with a lubricant, and an inside asbestos wearing surface on said core.

2. A packing constructed with an asbestos core, porous soft metal surrounding said core, a rubber cover for said metal, one side of which is grooved to receive the same, and the other side of which is formed with a plane surface, said core having an inside asbestos wearing surface.

3. A packing constructed with an asbestos core, a porous soft metal surrounding said core, a resilient covering for said metal, one side of which is grooved to receive the same, and the other side of which is formed with a plane surface, an inside asbestos wearing surface for the packing and a fabric covering enveloping the whole.

4. A packing constructed of an outside cover formed of rubber and one side of which has a lengthwise groove, a core in said groove formed of soft porous metal and asbestos enveloped by said metal, an asbestos wearing surface on the inner side of the core and a covering enveloping the whole.

5. A flexible packing constructed with a central core formed of asbestos and metallic covering surrounding said core and formed of thin metallic strips packed closely together making said covering porous, and outside covering for said metallic covering consisting of strips of resilient material substantially triangular in cross sections and fitted together so that the outer sides will be flush with each other, thus forming a groove between them to receive the metal covering of the core.

In testimony whereof we have signed our names to this specification in the presence of two subscribing witnesses.

THOMAS BLAKE DUPREE.
HAMPTON P. RHODES.

Witnesses:
W. H. DUNLAY,
E. V. HARDWAY.